Patented Sept. 16, 1930

1,776,002

UNITED STATES PATENT OFFICE

HEINRICH KÖRBER, OF INZERSDORF, NEAR VIENNA, AUSTRIA

PROCESS OF PRODUCING A SUBSTANCE FOR OBTAINING A HIGH GLOSS AND PURE WHITE COLOR ON PAPER AND THE LIKE

No Drawing. Application filed March 21, 1928, Serial No. 263,596, and in Austria March 24, 1927.

This invention relates to a process of producing a substance for obtaining a high gloss and pure white color on papers, art print papers, chromo-cartoons, substitute papers and the like.

It is already known to provide papers with a high gloss by the after treatment of a paper by means of covering the same with a glossy wax or by applying onto the paper a paste essentially consisting of chalks, zinc-oxide substances and subsequently calendering the same. This after-treatment increases the costs of manufacture of the paper ready for printing. Further the papers, subjected to the after-treatment in known manner, are not well suited for art printing for instance multi-color printings, because there is a danger of blotting the prints and soiling.

The process according to the invention differs from the known modes of treating the surface of the paper in that salts of the heavy metals group, preferably of the zinc group, are added to saponified stearine and the pasty substance obtained thereby is introduced into the paper. This pasty substance is added to the paper preferably directly in the cylinder.

Thus the process can be carried out in a most simple manner in that for instance for the treatment in the cylinder to every 100 parts of paper-pulp are added 2 to 5 parts of the paste, which is obtained by the addition for example of zinc-salts to the stearine.

Example 15 parts of stearine are saponified with about 20 to 25 parts of caustic potash or caustic soda and to the saponification substance is added a heavy metallic salt, for instance about 200 pounds in weight of a zinc-sulphate solution of 5%. For obtaining a substance of a marketable consistency the necessary quantity of dissolved potash- or sodium silicate is added to the substance above mentioned.

I claim:

1. A process for producing a high gloss and pure white color on paper and the like, which comprises adding a soluble salt of a heavy metal to a solution of saponified stearine, and then adding the resultant precipitate of insoluble heavy metal soap to the paper pulp.

2. A process for producing a high gloss and pure white color on paper and the like, which comprises adding a zinc salt to a solution of saponified stearine, and then adding the resultant precipitate of insoluble heavy metal soap to the paper pulp.

3. A process for producing a high gloss and pure white color on paper and the like, which comprises forming a pasty mass of salts of the heavy metals group and saponified stearine, and introducing the mass thus formed into the paper pulp.

4. A process for producing a high gloss and pure white color on paper and the like, which comprises forming a pasty mass of a zinc salt and saponified stearine, and introducing the mass thus formed into the paper pulp.

In testimony whereof I affix my signature.

DR. HEINRICH KÖRBER.